United States Patent
Yamawaki et al.

(10) Patent No.: US 11,812,759 B2
(45) Date of Patent: Nov. 14, 2023

(54) PRODUCTION METHOD FOR COMPOSITION WHICH CONTAINS NON-POLYMER CATECHIN

(71) Applicant: KAO CORPORATION, Tokyo (JP)

(72) Inventors: Kenji Yamawaki, Narita (JP); Yukiteru Sugiyama, Narita (JP)

(73) Assignee: KAO CORPORATION, Tokyo (JP)

( * ) Notice: Subject to any disclaimer, the term of this patent is extended or adjusted under 35 U.S.C. 154(b) by 291 days.

(21) Appl. No.: 16/464,550

(22) PCT Filed: Oct. 30, 2017

(86) PCT No.: PCT/JP2017/039093
§ 371 (c)(1),
(2) Date: May 28, 2019

(87) PCT Pub. No.: WO2018/100947
PCT Pub. Date: Jun. 7, 2018

(65) Prior Publication Data
US 2021/0106021 A1 Apr. 15, 2021

(30) Foreign Application Priority Data
Nov. 29, 2016 (JP) .................................. 2016-231577

(51) Int. Cl.
A23F 3/18 (2006.01)
A23F 3/12 (2006.01)
A23F 3/38 (2006.01)
A23F 3/20 (2006.01)

(52) U.S. Cl.
CPC .................. *A23F 3/38* (2013.01); *A23F 3/12* (2013.01); *A23F 3/18* (2013.01); *A23F 3/20* (2013.01)

(58) Field of Classification Search
None
See application file for complete search history.

(56) References Cited

U.S. PATENT DOCUMENTS

| 7,901,720 B2 * | 3/2011 | Fukuda .................. A23F 3/163 |
| | | 426/435 |
| 2005/0084574 A1 | 4/2005 | Yamada |
| 2016/0219897 A1 | 8/2016 | Shimoda et al. |
| 2017/0202234 A1 | 7/2017 | Fischer et al. |

FOREIGN PATENT DOCUMENTS

| CN | 1711866 A | 12/2005 |
| JP | 6-62738 A | 3/1994 |
| JP | 9-299030 A | 11/1997 |
| JP | 2005-168427 A | 6/2005 |
| JP | 2006-296355 A | 11/2006 |
| JP | 2007-60957 A | 3/2007 |
| JP | 2011-167091 A | 9/2011 |
| JP | 2013-169197 A | 9/2013 |
| JP | 2015-116132 A | 6/2015 |
| JP | 2016-119882 A | 7/2016 |
| JP | 2018-88911 A | 6/2018 |
| JP | 2019-10042 A | 1/2019 |
| WO | WO 2015/144495 A1 | 10/2015 |

OTHER PUBLICATIONS

Evidentiary Reference: Vincent Corporation, Measuring Brix, Accessed: Jan. 27, 2022 <https://vincentcorp.com/content/measuring-brix/> (Year: 2007).*

International Search Report dated Jan. 30, 2018, in PCT/JP2017/039093 filed on Oct. 30, 2017.

Extended European Search Report dated May 28, 2020, in Patent Application No. 17877080.6, 5 pages.

* cited by examiner

*Primary Examiner* — Viren A Thakur
*Assistant Examiner* — Thanh H Nguyen
(74) *Attorney, Agent, or Firm* — Oblon, McClelland, Maier & Neustadt, L.L.P.

(57) ABSTRACT

Provided is a production method for a composition containing non-polymer catechins, including the following step (A): (A) a step of bringing tea leaves into contact with an aqueous solution having a Brix of from 0.2% to 1.0% at from 80° C. to 100° C.

15 Claims, No Drawings

PRODUCTION METHOD FOR COMPOSITION WHICH CONTAINS NON-POLYMER CATECHIN

FIELD OF THE INVENTION

The present invention relates to a production method for a composition containing non-polymer catechins.

BACKGROUND OF THE INVENTION

Non-polymer catechins have been reported to have effects such as a cholesterol increase-suppressing action and an amylase activity-inhibiting action. For exerting such physiological effects, it is advantageous to ingest a large amount of the non-polymer catechins. However, tea leaves contain not only the non-polymer catechins, but also impurities, such as caffeine, and hence an attempt to extract the non-polymer catechins from the tea leaves causes the impurities, such as caffeine, to be also extracted at the same time.

Under such circumstances, as a technology for reducing a content of caffeine in the tea leaves, there have been proposed, for example, a method involving performing hot water treatment in which hot water at from 70° C. to 95° C. is sprayed onto raw leaves at a water pressure of from 0.01 MPa to 0.5 MPa per 1 kg of the tea leaves over from 60 seconds to 90 seconds (Patent Document 1), and a method involving bringing water at from 60° C. to 99° C. into contact with surfaces of tea leaves, then extracting the tea leaves with water at from 50° C. to 100° C., and then subjecting the resultant green tea extract solution to solid-liquid separation (Patent Document 2). In addition, there is also a report that, when tea leaves are put into hot water at from 60° C. to 100° C. flowing at a flow rate of from 20 m/min to 120 m/min, and brought into contact with the hot water for from 10 seconds to 120 seconds, a cuticular layer of the tea leaves is reduced, with the result that deterioration of the tea leaves can be suppressed (Patent Document 3).

[Patent Document 1] JP-A-2007-60957
[Patent Document 2] JP-A-2015-116132
[Patent Document 3] JP-A-2011-167091

SUMMARY OF THE INVENTION

The present invention provides a production method for a composition containing non-polymer catechins, comprising the following step (A):

(A) a step of bringing tea leaves into contact with an aqueous solution having a Brix of from 0.2% to 1.0% at from 80° C. to 100° C.

DETAILED DESCRIPTION OF THE INVENTION

In each of the above-mentioned methods described in the prior art documents, the content of caffeine in green tea leaves can be reduced, but at the same time, the taste and flavor of green tea is also reduced. Therefore, there is a demand for the creation of a production method for a composition containing non-polymer catechins capable of selectively reducing the content of caffeine without impairing the taste and flavor of green tea.

The present invention relates to a production method for a composition containing non-polymer catechins with a reduced content of caffeine and a rich taste and flavor of green tea.

As a result of investigations, the inventors of the present invention found that a composition containing non-polymer catechins with a reduced content of caffeine and a rich taste and flavor of green tea is obtained by bringing tea leaves into contact with an aqueous solution having its Brix controlled within a specific range and having a specific temperature.

According to the present invention, it is possible to efficiently produce the composition containing non-polymer catechins with a reduced content of caffeine and a rich taste and flavor of green tea.

A production method for a composition containing non-polymer catechins of the present invention comprises a step (A). In addition, the method may further comprise, after the step (A), a step (B) to be described later. Each step is described in detail below.

Step (A)

The step (A) is a step of bringing tea leaves into contact with an aqueous solution having a Brix of from 0.2% to 1.0% at from 80° C. to 100° C. With this, while fermentation of the tea leaves is suppressed, caffeine can be selectively removed without impairing the taste and flavor of green tea. The tea leaves are preferably raw tea leaves. As used herein, the term "raw tea leaves" refers to tea leaves after plucking and before heat treatment, or tea leaves stored in a refrigerated or frozen state after plucking and before heat treatment. From the viewpoint of the suppression of fermentation, as the raw tea leaves, it is preferred to use tea leaves within 24 hours after plucking, or use tea leaves stored in a refrigerated or frozen state within 24 hours after plucking.

Tea leaves as plucked (full leaves) are preferably used as the tea leaves from the viewpoint of selectively removing caffeine without impairing the taste and flavor of green tea. A plucking method is, for example, hand picking, shear plucking, or mechanical picking, but is not particularly limited. The hand picking is, for example, two-leaf picking or three-leaf picking, but is not particularly limited. In addition, the mechanical picking may be performed using a mobile machine, a portable machine, a self-propelled machine, a riding machine, a rail-tracking machine, or the like depending on, for example, the size of the machine and a use method therefor, and is generally performed by normal picking. The tea leaves plucked by any of those methods may be used without being cut. The harvest season of the tea leaves is not particularly limited.

The tea variety of the tea leaves is not particularly limited as long as the tea variety is a generally cultivated one, and examples thereof include the genus *Camellia*, such as tea leaves (*Camellia sinensis*) selected from *C. sinensis* var. *sinensis* (including the Yabukita variety), *C. sinensis* var. *assamica*, and hybrids thereof. Specific examples of the variety may include: Japanese tea leaves, such as Benifuki, Benihomare, Benifuji, Benihikari, Yabukita, Asatsuyu, Yamatomidori, Makinoharawase, Kanayamidori, Yaeho, Surugawase, Yutakamidori, Okumusashi, Okumidori, Ooiwase, Okuhikari, Meiryoku, Samidori, Komakage, Yamanami, Minekaori, Hatsumomiji, Yamakai, and Karabeni; and tea leaves except the Japanese tea leaves, such as Darjeeling, Uva, Keemun, Assam, and Kenya. One or more of the tea leaves may be appropriately selected and used, and stems may be used as well as the tea leaves.

The aqueous solution to be used in the step (A) is not particularly limited as long as its Brix falls within the range of from 0.2% to 1.0%, but a tea extract solution having a Brix of from 0.2% to 1.0% is preferred from the viewpoint of selectively removing caffeine without impairing the taste and flavor of green tea. As used herein, the term "Brix" refers to a value measured using a sugar refractometer, the value corresponding to the mass percentage of an aqueous solution of sucrose at 20° C. Specifically, the Brix may be measured by a method described in Examples to be described later.

The kind of water contained in the aqueous solution is not particularly limited, and for example, tap water, distilled water, ion-exchanged water, or natural water may be appropriately selected and used.

Tea leaves serving as a raw material for the tea extract solution are not particularly limited, and examples of the tea extract solution include tea extract solutions extracted from the genus *Camellia*, such as tea leaves (*Camellia sinensis*) selected from *C. sinensis* var. *sinensis* (including the Yabukita variety), *C. sinensis* var. *assamica*, and hybrids thereof. The tea leaves may be classified into unfermented tea, semi-fermented tea, and fermented tea depending on their processing methods. Examples of the unfermented tea include green teas, such as sencha, bancha, tencha, kamairicha, kukicha, bocha, and mecha. In addition, examples of the semi-fermented tea include oolong teas, such as tekkannon, shikishu, ogonkei, and buigancha. Further, examples of the fermented tea include black teas, such as Darjeeling, Assam, and Sri Lanka. One or more of the tea leaves may be used. Of those, a green tea extract solution is preferred as the tea extract solution from the viewpoint of selectively removing caffeine without impairing the taste and flavor of green tea.

As a method of obtaining a tea extract solution having a predetermined Brix, there is given, for example, a method involving extracting tea leaves with water.

As the tea leaves, those given in the foregoing may be used, and green tea leaves are preferred from the viewpoint of selectively removing caffeine without impairing the taste and flavor of green tea. The tea leaves may be full leaves, or may be cut or pulverized ones.

The temperature of the water to be used for the extraction is, for example, from 80° C. to 100° C., preferably from 83° C. to 99° C., more preferably from 85° C. to 98° C., even more preferably from 87° C. to 97° C.

A period of time for which the extraction is performed is, for example, preferably from 1.0 minute to 120 minutes, more preferably from 2.0 minutes to 90 minutes, even more preferably from 2.5 minutes to 60 minutes.

A known method, such as stirring extraction or column extraction, may be adopted as an extraction method. In addition, a commercially available product may be used as the green tea extract solution, and examples thereof may include "POLYPHENON" manufactured by Mitsui Norin Co., Ltd., "TEAFURAN" manufactured by Ito En, Ltd., and "SUNPHENON" manufactured by Taiyo Kagaku Co., Ltd. As required, the tea extract solution may be diluted with water or concentrated so as to have a desired Brix before use.

The Brix of the aqueous solution is preferably 0.2% or more, and is preferably 1.0% or less, more preferably 0.8% or less, more preferably 0.7% or less, even more preferably 0.4% or less, from the viewpoint of selectively removing caffeine without impairing the taste and flavor of green tea. Such Brix falls within the range of preferably from 0.2% to 1.0%, more preferably from 0.2% to 0.8%, more preferably from 0.2% to 0.7%, even more preferably from 0.2% to 0.4%.

The temperature of the aqueous solution, which is from 80° C. to 100° C., is preferably 83° C. or more, more preferably 85° C. or more, even more preferably 87° C. or more, from the viewpoint of selectively removing caffeine without impairing the taste and flavor of green tea, and is preferably 99° C. or less, more preferably 98° C. or less, even more preferably 97° C. or less, from the viewpoint of temperature control. Such temperature falls within the range of preferably from 83° C. to 99° C., more preferably from 85° C. to 98° C., even more preferably from 87° C. to 97° C.

A method for the contact is not particularly limited as long as surfaces of the tea leaves can be brought into contact with the aqueous solution, and examples thereof may include a method involving immersing the tea leaves in the aqueous solution, and a method involving feeding the aqueous solution in a shower form to the tea leaves.

The amount of the aqueous solution to be used for the contact may be appropriately selected depending on the contact method and the scale of production, but is preferably 3 times by mass or more, more preferably 5 times by mass or more, more preferably 10 times by mass or more, even more preferably 15 times by mass or more, and is preferably 100 times by mass or less, more preferably 75 times by mass or less, even more preferably 50 times by mass or less, with respect to the tea leaves, from the viewpoint of selectively removing caffeine without impairing the taste and flavor of green tea. Such amount of the aqueous solution falls within the range of preferably from 3 times by mass to 100 times by mass, more preferably from 5 times by mass to 75 times by mass, more preferably from 10 times by mass to 50 times by mass, even more preferably from 15 times by mass to 50 times by mass, with respect to the tea leaves.

A period of time for which the contact with the aqueous solution is performed may be appropriately selected depending on the contact method and the scale, but is preferably 2 minutes or more, more preferably 2.5 minutes or more, even more preferably 3 minutes or more, and is preferably 10 minutes or less, more preferably 9 minutes or less, more preferably 7 minutes or less, more preferably 6 minutes or less, even more preferably 5 minutes or less, from the viewpoint of selectively removing caffeine without impairing the taste and flavor of green tea. Such contact time falls within the range of preferably from 2 minutes to 10 minutes, more preferably from 2.5 minutes to 9 minutes, more preferably from 3 minutes to 7 minutes, more preferably from 3 minutes to 6 minutes, even more preferably from 3 minutes to 5 minutes.

After the step (A), the step (B) to be described later may be performed, and before the step (B), the tea leaves that have been brought into contact with the aqueous solution may be recovered. As a method for the recovery, the tea leaves may be recovered with a mesh, may be recovered with a filter, may be recovered with a centrifuge, or may be recovered with a conveyor or the like.

In addition, after the step (A), the step (B) to be described later may be performed, and before the step (B), water remaining on the surfaces of the tea leaves after the step (A) may be removed. As a method for the removal, the water may be removed by shaking or the like, or may be lightly wiped off with waste cloth, paper, or the like. In addition, the tea leaves after the step (A) may be dried, but it is preferred that the tea leaves be not dried from the viewpoint of suppressing the deterioration of taste and flavor (unpleasant taste or coarseness) due to heat.

In addition, before the step (B), the tea leaves after the step (A) may be subjected to cutting treatment or pulverization treatment to enhance the extraction efficiency of the non-polymer catechins. A cutting or pulverization method is not particularly limited, and for example, the cutting treatment may be performed using a cutter, or using a rolling machine, a rotorvane, or a CTC machine. In addition, the pulverization treatment may be performed using a grinder, a mill, a ball mill, or the like. The tea leaves after the cutting treatment each have a size of typically from 1 mm to 20 mm, preferably from 5 mm to 15 mm. In addition, the tea leaves after the pulverization treatment each have a size of typically from 0.1 mm to 5 mm, preferably from 0.3 mm to 3 mm.

Step (B)

The step (B) is a step of extracting the tea leaves after the step (A) with water at from 50° C. to 100° C. With this, the non-polymer catechins can be efficiently extracted with a rich taste and flavor of green tea. As used herein, the term "non-polymer catechins" is a collective term encompassing gallate forms including epigallocatechin gallate, gallocatechin gallate, epicatechin gallate, and catechin gallate, and non-gallate forms including epigallocatechin, gallocatechin, epicatechin, and catechin. The concentration of the non-polymer catechins is defined on the basis of the total amount of the above-mentioned eight kinds, and in the present invention, at least one out of the eight kinds of non-polymer catechins only needs to be contained.

A known method, such as stirring extraction, column extraction, or drip extraction, may be adopted as a method for the extraction.

The temperature of the water to be used for the extraction, which is generally from 50° C. to 100° C., is preferably 60° C. or more, more preferably 70° C. or more, even more preferably 80° C. or more, from the viewpoint of the extraction efficiency of the non-polymer catechins, and is preferably 98° C. or less, more preferably 95° C. or less, from the viewpoint of temperature control. Such temperature of the water falls within the range of preferably from 60° C. to 98° C., more preferably from 70° C. to 98° C., even more preferably from 80° C. to 95° C.

In addition, the water to be used may be water similar to those described above, and of those, ion-exchanged water is preferred in terms of taste. An organic acid or a salt thereof, such as sodium ascorbate, or an inorganic acid or a salt thereof, such as sodium hydrogen carbonate, may be added to the water to be used for the extraction.

The amount of the water to be used for the extraction may be appropriately selected depending on the extraction method, but the amount of the water with respect to the tea leaves is preferably 1 time by mass or more, more preferably 1.5 times by mass or more, even more preferably 2 times by mass or more, from the viewpoint of the extraction efficiency of the non-polymer catechins, and is preferably 20 times by mass or less, more preferably 15 times by mass or less, even more preferably 10 times by mass or less, from the viewpoint of the taste and flavor of green tea. Such amount of the water falls within the range of preferably from 1 time by mass to 20 times by mass, more preferably from 1.5 times by mass to 15 times by mass, even more preferably from 2 times by mass to 10 times by mass, with respect to the tea leaves.

In addition, a period of time for which the extraction is performed varies depending on the scale and the like, but for example, is preferably 5 minutes or more, more preferably 8 minutes or more, even more preferably 10 minutes or more, from the viewpoint of the extraction efficiency of the non-polymer catechins, and is preferably 120 minutes or less, more preferably 90 minutes or less, even more preferably 60 minutes or less, from the viewpoint of a reduction in unpleasant taste or coarseness. Such period of time for which the extraction is performed falls within the range of preferably from 5 minutes to 120 minutes, more preferably from 8 minutes to 90 minutes, even more preferably from 10 minutes to 60 minutes.

After the extraction, filtration may be performed as an operation of separating the tea leaves and the green tea extract solution from each other. For the filtration, for example, filter separation with filter paper, a filter made of a metal, such as stainless steel, or the like, or centrifugation may be adopted. The mesh size of the filter made of a metal is, for example, from 18 mesh to 300 mesh. A general device of, for example, a separation plate type, a cylinder type, or a decanter type may be used as a centrifuge to be used for the centrifugation.

After the step (B), the green tea extract solution obtained through the step (B) may be subjected to solid-liquid separation. With this, a composition containing non-polymer catechins useful as a raw material for producing a tea beverage having reduced unpleasant taste or coarseness and a rich taste and flavor of green tea can be obtained.

A method generally used in the food industry may be adopted as the solid-liquid separation. Examples thereof include paper filtration, centrifugation, and membrane treatment. One or a combination of two or more thereof may be performed.

In the paper filtration, for example, filter paper may be precoated with a filter aid. Examples of the filter aid include diatomaceous earth, cellulose, and a combination thereof, and the amount of the filter aid to be used may be appropriately selected. In addition, a filtration method such as pressure filtration or suction filtration may also be adopted.

As in the foregoing, a general device of, for example, a separation plate type, a cylinder type, or a decanter type may be used as a centrifuge to be used for the centrifugation.

A temperature during the centrifugation is preferably from 5° C. to 80° C., more preferably from 10° C. to 70° C., from the viewpoints of an increase in recovery ratio of the non-polymer catechins and the removal of impurities. In addition, the number of revolutions and a period of time may be appropriately set. For example, in the case of the separation plate type, the number of revolutions is preferably from 2,000 r/min to 10,000 r/min, more preferably from 2,500 r/min to 9,000 r/min, even more preferably from 3,000 r/min to 8,000 r/min, and the period of time is preferably from 0.2 minute to 75 minutes, more preferably from 0.5 minute to 60 minutes, even more preferably from 1 minute to 30 minutes.

With regard to conditions for treatment by the membrane filtration, the treatment may be performed under general filtration conditions.

A membrane pore size is preferably 0.1 µm or more, more preferably 0.15 µm or more, even more preferably 0.2 µm or more, and is preferably 10 µm or less, more preferably 5 µm or less, even more preferably 2 µm or less, from the viewpoints of an increase in recovery ratio of the non-polymer catechins and the removal of impurities. Such membrane pore size falls within the range of preferably from 0.1 µm to 10 µm, more preferably from 0.15 µm to 5 µm, even more preferably from 0.2 µm to 2 µm. A measurement method for the membrane pore size is exemplified by a general measurement method involving using a mercury intrusion method, a bubble point test, a bacterial filtration method, or the like, and it is preferred to use a value determined by a bubble point test.

As a material for the membrane, there may be given, for example, a polymer membrane, a ceramic membrane, and a stainless-steel membrane.

Thus, the composition containing non-polymer catechins of the present invention may be produced. The composition containing non-polymer catechins may have the following characteristic: a mass ratio [(b)/(a)] between (a) the non-polymer catechins and (b) caffeine is generally from 0.06 to 0.15, preferably from 0.07 to 0.13, more preferably from 0.08 to 0.12.

In addition, examples of the form of the composition containing non-polymer catechins include various forms such as a liquid, a slurry, a semi-solid, and a solid. When a liquid is desired as the product form of the composition containing non-polymer catechins, for example, the composition containing non-polymer catechins may be concentrated by reduced-pressure concentration, reverse osmosis membrane concentration, or the like. In addition, when a solid is desired, for example, the composition containing non-polymer catechins may be powdered by spray drying, freeze-drying, or the like.

The present invention further discloses the following production method fora composition containing non-polymer catechins regarding the embodiment described above.

<1>

A production method for a composition containing non-polymer catechins, comprising the following step (A):

(A) a step of bringing tea leaves into contact with an aqueous solution having a Brix of from 0.2% to 1.0% at from 80° C. to 100° C.

<2>

The production method for a composition containing non-polymer catechins according to the above-mentioned item <1>, preferably further comprising the following step (B) after the step (A):

(B) a step of extracting the tea leaves after the step (A) with water at from 50° C. to 100° C.

<3>

The production method for a composition containing non-polymer catechins according to the above-mentioned item <1> or <2>, wherein, in the step (A), the tea leaves preferably comprise full leaves (tea leaves as plucked).

<4>

The production method f or a composition containing non-polymer catechins according to any one of the above-mentioned items <1> to <3>, wherein, in the step (A), the aqueous solution preferably comprises a green tea extract solution.

<5>

The production method for a composition containing non-polymer catechins according to any one of the above-mentioned items <1> to <4>, wherein, in the step (A), the Brix of the aqueous solution is preferably from 0.2% to 1.0%, more preferably from 0.2% to 0.8%, more preferably from 0.2% to 0.7%, even more preferably from 0.2% to 0.4%.

<6>

The production method for a composition containing non-polymer catechins according to any one of the above-mentioned items <1> to <4>, wherein, in the step (A), the aqueous solution preferably comprises a green tea extract solution having a Brix of from 0.2% to 0.4%.

<7>

The production method for a composition containing non-polymer catechins according to any one of the above-mentioned items <1> to <6>, wherein the step (A) is performed at preferably from 83° C. to 99° C., more preferably from 85° C. to 98° C., even more preferably from 87° C. to 98° C.

<8>

The production method for a composition containing non-polymer catechins according to any one of the above-mentioned items <1> to <7>, wherein, in the step (A), a method for the contact of the tea leaves with the aqueous solution preferably comprises a method involving immersing the tea leaves in water, or a method involving feeding water in a shower form to the tea leaves.

<9>

The production method for a composition containing non-polymer catechins according to any one of the above-mentioned items <1> to <8>, wherein, in the step (A), the aqueous solution is used in an amount of preferably from 3 times by mass to 100 times by mass, more preferably from 5 times by mass to 75 times by mass, even more preferably from 10 times by mass to 50 times by mass, with respect to the tea leaves.

<10>

The production method for a composition containing non-polymer catechins according to any one of the above-mentioned items <1> to <9>, wherein, in the step (A), a period of time for which the contact with the aqueous solution is performed is preferably from 3 minutes to 7 minutes.

<11>

The production method for a composition containing non-polymer catechins according to any one of the above-mentioned items <1> to <10>, preferably further comprising, after the step (A) (preferably before the step (B)), a step of subjecting the tea leaves after the step (A) to cutting treatment or pulverization treatment.

<12>

The production method for a composition containing non-polymer catechins according to the above-mentioned item <11>, wherein the tea leaves after the cutting treatment each have a size of preferably from 1 mm to 20 mm, more preferably from 5 mm to 15 mm, and the tea leaves after the pulverization treatment each have a size of preferably from 0.1 mm to 5 mm, more preferably from 0.3 mm to 3 mm.

<13>

The production method for a composition containing non-polymer catechins according to any one of the above-mentioned items <2> to <12>, wherein, in the step (B), a method for the extracting preferably comprises stirring extraction, column extraction, or drip extraction.

<14>

The production method for a composition containing non-polymer catechins according to any one of the above-mentioned items <2> to <13>, wherein, in the step (B), the water has a temperature of preferably from 50° C. to 100° C., more preferably from 60° C. to 98° C., more preferably from 70° C. to 98° C., even more preferably from 80° C. to 95° C.

<15>

The production method for a composition containing non-polymer catechins according to any one of the above-mentioned items <2> to <14>, wherein, in the step (B), the water comprises preferably one or more selected from tap water, distilled water, ion-exchanged water, and natural water, more preferably ion-exchanged water.

<16>

The production method fora composition containing non-polymer catechins according to any one of the above-mentioned items <2> to <15>, wherein, in the step (B), the water is used in an amount of preferably from 1 time by mass to 20 times by mass, more preferably from 1.5 times by mass to 15 times by mass, even more preferably from 2 times by mass to 10 times by mass, with respect to the tea leaves.

<17>

The production method for a composition containing non-polymer catechins according to any one of the above-mentioned items <2> to <16>, wherein, in the step (B), a period of time for which the extracting is performed is preferably from 5 minutes to 120 minutes, more preferably from 8 minutes to 90 minutes, even more preferably from 10 minutes to 60 minutes.

EXAMPLES

1. Analysis of Non-Polymer Catechins and Caffeine

A sample diluted with pure water was measured by a gradient method using a high-performance liquid chromatograph (model SCL-10AVP) manufactured by Shimadzu Corporation having mounted thereon an octadecyl group-introduced packed column for liquid chromatography (L-column TM ODS, 4.6 mm$\varphi$×250 mm: manufactured by Chemicals Evaluation and Research Institute, Japan) at a column temperature of 35° C. The measurement was carried out using a distilled water solution containing 0.1 mol/L acetic acid as a mobile phase solution A and an acetonitrile solution containing 0.1 mol/L acetic acid as a mobile phase solution B under the conditions of a flow rate of 1 mL/min, a sample injection volume of 10 μL, and a UV detector wavelength of 280 nm. The gradient conditions are as described below.

Concentration Gradient Condition (volt)

| Time | Solution A concentration | Solution B concentration |
|---|---|---|
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |
| 49 min | 97% | 3% |
| 60 min | 97% | 3% |

Retention Times of Non-polymer Catechins and Caffeine
(1) Catechin (C): 25.4 min
(2) Epicatechin (EC): 31.4 min
(3) Epicatechin gallate (ECg): 40.7 min
(4) Epigallocatechin gallate (EGCg): 31.7 min
(5) Gallocatechin gallate (GCg): 33.9 min
(6) Catechin gallate (Cg): 41.4 min
(7) Epigallocatechin (EGC): 23.5 min
(8) Gallocatechin (GC): 14.7 min
(9) Caffeine: 26.9 min On the basis of the areal thus determined, the contents (mass %) of the non-polymer catechins and caffeine were determined using reagents (C, EC, BCg, EGCg, GCg, Cg, EGC, and GC: manufactured by Mitsui Norin Co., Ltd., caffeine: Wako Pure Chemical Industries, Ltd.) as standard substances.

2. Measurement of Brix

A sample was adjusted to a temperature of 20° C. and measured for its sugar refractometer reading (Brix) using a saccharimeter (Atago RX-5000 (manufactured by Atago Co., Ltd.)).

3. Sensory Evaluation

Each composition containing non-polymer catechins was diluted with ion-exchanged water to a concentration of the non-polymer catechins of 0.175 g/100 mL to prepare a tea beverage. Subsequently, each beverage was drunk by an expert panel of four members, and was evaluated for its taste and flavor of green tea on a four-point scale, and evaluated for its unpleasant taste or coarseness on a two-point scale. After that, final scores were determined through discussion.

(1) Evaluation Criteria for Taste and Flavor of Green Tea
4: The taste and flavor of green tea is rich (equivalent to Example 1).
3: The taste and flavor of green tea is present (the taste and flavor of green tea is felt more than in Comparative Example 1, but not felt as much as in Example 1).
2: The taste and flavor of green tea is slight (equivalent to Comparative Example 1).
1: The taste and flavor of green tea is hardly present (the taste and flavor of green tea is not felt as much as in Comparative Example 1).

(2) Evaluation Criteria for Unpleasant Taste or Coarseness
2: Unpleasant taste or coarseness remaining on the tongue is weak.
1: Unpleasant taste or coarseness remaining on the tongue is strong.

Preparation Example 1

Preparation of Green Tea Extract Solution Having Brix of from 0.2% to 1.0%

1 kg of raw tea leaves as full leaves were extracted with 10 kg of ion-exchanged water at 90° C. for 180 seconds. Next, filtration was performed with a mesh to recover a green tea extract solution, and the tea leaves were discarded. The green tea extract solution had a Brix of 0.27%. The green tea extract solution was diluted with water or concentrated to prepare green tea extract solutions having Brix values shown in Table 1.

Preparation Example 2

Preparation of Green Tea Extract Solution Having Brix of 0.07%

300 g of raw tea leaves as full leaves were extracted with 20 kg of ion-exchanged water at 90° C. for 150 seconds. Next, filtration was performed with a mesh to recover a green tea extract solution, and the tea leaves were discarded. Next, 300 g of tea leaves were extracted with the resultant green tea extract solution at 90° C. for 150 seconds. Next, filtration was performed with a mesh to recover the green tea extract solution, and the tea leaves were discarded. Further, 300 g of tea leaves were extracted with the resultant green tea extract solution for 150 seconds. Next, filtration was performed with a mesh to recover the green tea extract solution, and the tea leaves were discarded. The finally obtained green tea extract solution had a Brix of 0.07%.

Example 1

Step (A)

10 kg of the green tea extract solution having a Brix of 0.40 obtained in Preparation Example 1 was heated to 90° C., and 1 kg of raw tea leaves as full leaves were brought into contact therewith by being immersed therein for 3 minutes. Next, filtration was performed with a mesh to recover the tea leaves, and the tea leaf extract solution was discarded.

Next, the recovered tea leaves were cut with a food processor. The tea leaves after the cutting each had a size of about 3 mm.

Step (B)

Next, the tea leaves after the cutting were subjected to stirring extraction with 3 kg of ion-exchanged water at 90° C. for 20 minutes, followed by filtration to provide a green tea extract solution.

Next, the resultant green tea extract solution was centrifuged, and the filtrate was freeze-dried to provide a powdered composition containing non-polymer catechins. The results of the analysis thereof are shown in Table 1.

The resultant powdered composition containing non-polymer catechins was diluted with ion-exchanged water to a concentration of the non-polymer catechins of 0.175 g/100 mL to prepare a tea beverage, which was subjected to the sensory evaluation. The results are shown in Table 1.

Examples 2 and 3

Powdered compositions containing non-polymer catechins were obtained by the same procedure as in Example 1 except that, in the step (A) of Example 1, the amount of the aqueous solution used was changed as shown in Table 1. After that, the analysis of the powdered compositions containing non-polymer catechins and the sensory evaluation of tea beverages were performed by the same procedure as in Example 1. The results are collectively shown in Table 1.

Examples 4 to 7

Powdered compositions containing non-polymer catechins were obtained by the same procedure as in Example 1 except that, in the step (A) of Example 1, the contact time was changed as shown in Table 1. After that, the analysis of the powdered compositions containing non-polymer catechins and the sensory evaluation of tea beverages were performed by the same procedure as in Example 1. The results are collectively shown in Table 1.

Examples 8 to 10

Powdered compositions containing non-polymer catechins were obtained by the same procedure as in Example 1 except that, in the step (A) of Example 1, the Brix of the aqueous solution was changed as shown in Table 1. After that, the analysis of the powdered compositions containing non-polymer catechins and the sensory evaluation of tea beverages were performed by the same procedure as in Example 1. The results are collectively shown in Table 1.

Example 11

A powdered composition containing non-polymer catechins was obtained by the same procedure as in Example 1 except that, in the step (A) of Example 1, after the step (A), the tea leaves after the step (A) were dried before the step (B). After that, the analysis of the powdered composition containing non-polymer catechins and the sensory evaluation of a tea beverage were performed by the same procedure as in Example 1. The results are collectively shown in Table 1.

Comparative Example 1

A powdered composition containing non-polymer catechins was obtained by the same procedure as in Example 1 except that, in the step (A) of Example 1, hot water at 90° C. was used and the contact time was changed as shown in Table 1. After that, the analysis of the powdered composition containing non-polymer catechins and the sensory evaluation of a tea beverage were performed by the same procedure as in Example 1. The results are collectively shown in Table 1.

Comparative Example 2

A powdered composition containing non-polymer catechins was obtained by the same procedure as in Example 1 except that, in the step (A) of Example 1, the green tea extract solution having a Brix of 0.07% obtained in Preparation Example 2 was used. After that, the analysis of the powdered composition containing non-polymer catechins and the sensory evaluation of a tea beverage were performed by the same procedure as in Example 1. The results are collectively shown in Table 1.

Comparative Example 3

A powdered composition containing non-polymer catechins was obtained by the same procedure as in Comparative Example 2 except that, after the step (A), the tea leaves after the step (A) were dried before the step (B). After that, the analysis of the powdered composition containing non-polymer catechins and the sensory evaluation of a tea beverage were performed by the same procedure as in Example 1. The results are collectively shown in Table 1.

Comparative Example 4

A powdered composition containing non-polymer catechins was obtained by the same procedure as in Example 1 except that, in the step (A) of Example 1, an aqueous solution at 75° C. was used. After that, the analysis of the powdered composition containing non-polymer catechins and the sensory evaluation of a tea beverage were performed by the same procedure as in Example 1. The results are collectively shown in Table 1.

TABLE 1

| | | | | Example 1 | Example 2 | Example 3 | Example 4 | Example 5 | Example 6 | Example 7 | Example 8 |
|---|---|---|---|---|---|---|---|---|---|---|---|
| Production conditions | Step (A) | Raw tea leaves | [kg] | 1 | 1 | 1 | 1 | 1 | 1 | 1 | 1 |
| | | Aqueous solution | [kg] | 10 | 25 | 50 | 10 | 10 | 10 | 10 | 10 |
| | | Temperature of aqueous solution | [° C.] | 90 | 90 | 90 | 90 | 90 | 90 | 90 | 90 |
| | | Brix of aqueous solution | [%] | 0.4 | 0.4 | 0.4 | 0.4 | 0.4 | 0.4 | 0.4 | 0.2 |
| | | Contact time | [min] | 3 | 3 | 3 | 2 | 5 | 7 | 9 | 3 |
| | | Drying of tea leaves after step (A) | [—] | — | — | — | — | — | — | — | — |

TABLE 1-continued

|  |  |  | [°C.] | 90 | 90 | 90 | 90 | 90 | 90 | 90 | 90 |
|---|---|---|---|---|---|---|---|---|---|---|---|
|  | Step (B) | Extraction temperature |  |  |  |  |  |  |  |  |  |
|  |  | Extraction time | [min] | 20 | 20 | 20 | 20 | 20 | 20 | 20 | 20 |
|  |  | Water/raw tea leaves | [−] | 3 |  |  |  |  |  |  |  |
| Analysis |  | Caffeine/non-polymer catechins | [−] | 0.103 | 0.090 | 0.086 | 0.130 | 0.104 | 0.111 | 0.118 | 0.096 |
|  |  | Taste and flavor of green tea | [−] | 4 | 4 | 4 | 4 | 4 | 4 | 3 | 4 |
|  |  | Unpleasant taste or coarseness | [−] | 2 | 2 | 2 | 2 | 2 | 2 | 2 | 2 |

|  |  |  |  | Example 9 | Example 10 | Comparative Example 1 | Comparative Example 2 | Comparative Example 3 | Comparative Example 4 | Example 11 |
|---|---|---|---|---|---|---|---|---|---|---|
| Production conditions | Step (A) | Raw tea leaves | [kg] | 1 | 1 | 1 | 1 | 1 | 1 | 1 |
|  |  | Aqueous solution | [kg] | 10 | 10 | 10 | 10 | 10 | 10 | 10 |
|  |  | Temperature of aqueous solution | [°C.] | 90 | 90 | 90 | 90 | 90 | 75 | 90 |
|  |  | Brix of aqueous solution | [%] | 0.8 | 1.0 | 0 | 0.07 | 0.07 | 0.4 | 0.4 |
|  |  | Contact time | [min] | 4 | 3 | 4 | 3 | 3 | 3 | 3 |
|  | Drying of tea leaves after step (A) |  | [−] | — | — | — | — | Present | — | Present |
|  | Step (B) | Extraction temperature | [°C.] | 90 | 90 | 90 | 90 | 90 | 90 | 90 |
|  |  | Extraction time | [min] | 20 | 20 | 20 | 20 | 20 | 20 | 20 |
|  |  | Water/raw tea leaves | [−] |  |  |  |  |  |  |  |
| Analysis |  | Caffeine/non-polymer catechins | [−] | 0.134 | 0.141 | 0.072 | 0.091 | 0.093 | 0.172 | 0.103 |
|  |  | Taste and flavor of green tea | [−] | 4 | 4 | 2 | 2 | 2 | 4 | 4 |
|  |  | Unpleasant taste or coarseness | [−] | 2 | 2 | 2 | 2 | 1 | 2 | 1 |

It is found from Table 1 that, through the steps including the step (A) according to the invention of the present application, a composition containing non-polymer catechins with a reduced content of caffeine and a rich taste and flavor of green tea is obtained.

The invention claimed is:

1. A production method for a composition comprising non-polymer catechins, the method comprising:
   (A) bringing tea leaves into contact with a tea extract solution having a Brix of from 0.2% to 1.0% at from 83° C. to 100° C.; and
   (B) extracting the tea leaves after step (A) with water at a temperature of from 50° C. to 100° C.

2. The production method according to claim 1, wherein the tea extract solution in step (A) has a Brix of from 0.2% to 0.8%.

3. The production method according to claim 1, wherein a period of time for which the contact of the tea leaves with the tea extract solution in step (A) is performed is from 3 minutes to 7 minutes.

4. The production method according to claim 1, wherein the production method does not comprise drying the tea leaves after step (A) and before step (B).

5. The production method according to claim 1, wherein, before step (B), the tea leaves after step (A) are cut.

6. The production method according to claim 1, further comprising, after step (B), subjecting the tea extract solution obtained through step (B) to solid-liquid separation.

7. The production method according claim 1, wherein a period of time for which the extracting is performed is from 5 minutes to 120 minutes.

8. The production method according to claim 1, wherein in step (A) the tea leaves comprise full leaves.

9. The production method according to claim 1, wherein the bringing the tea leaves into contact with the tea extract solution comprises immersing the tea leaves in the tea extract solution, or feeding the tea extract solution in a shower form to the tea leaves.

10. The production method according to claim 1, wherein in step (A) the tea extract solution is present in an amount of from 3 times by mass to 100 times by mass with respect to the tea leaves.

11. The production method according to claim 1, wherein the tea extract solution in step (A) comprises a green tea extract solution.

12. The production method according to claim 5, wherein the tea leaves each have a size of from 1 mm to 20 mm after the cutting.

13. The production method according to claim 1, wherein the extracting comprises at least one selected from the group consisting of stirring extraction, column extraction, and drip extraction.

14. The production method according to claim 1, wherein in step (B) water is present in an amount of 1 time by mass to 20 times by mass with respect to the tea leaves.

15. The production method according to claim 1, wherein the bringing the tea leaves into contact with the tea extract, solution having the Brix of from 0.2% to 1.0% is conducted at from 85° C. to 100° C.

\* \* \* \* \*